(12) United States Patent
Lien et al.

(10) Patent No.: US 9,581,180 B2
(45) Date of Patent: Feb. 28, 2017

(54) CLAMPER AND DEVICE USING THE SAME

(71) Applicant: ABILITY ENTERPRISE CO., LTD., New Taipei (TW)

(72) Inventors: Hao-Chung Lien, New Taipei (TW); Hsien-Ming Lee, New Taipei (TW); Yu-Fang Lin, New Taipei (TW)

(73) Assignee: ABILITY ENTERPRISE CO., LTD., New Taipei (TW)

(*) Notice: Subject to any disclaimer, the term of this patent is extended or adjusted under 35 U.S.C. 154(b) by 45 days.

(21) Appl. No.: 14/692,080

(22) Filed: Apr. 21, 2015

(65) Prior Publication Data

US 2015/0330426 A1   Nov. 19, 2015

(30) Foreign Application Priority Data

May 15, 2014 (TW) .............................. 103117072 A (51) Int. Cl.
| | | |
|---|---|---|
| *F16M 11/02* | (2006.01) | |
| *F16B 2/10* | (2006.01) | |
| *F16B 2/12* | (2006.01) | |
| *F16B 2/18* | (2006.01) | |
| *F16M 11/04* | (2006.01) | |
| *F16M 13/00* | (2006.01) | |

(52) U.S. Cl.
CPC . *F16B 2/10* (2013.01); *F16B 2/12* (2013.01); *F16B 2/18* (2013.01); *F16M 11/041* (2013.01); *F16M 13/00* (2013.01); *F16M 2200/02* (2013.01); *Y10T 24/44299* (2015.01); *Y10T 24/44581* (2015.01)

(58) Field of Classification Search
CPC ........ F16B 2/12; F16B 2/18; Y10T 24/44581; Y10T 24/44299
USPC ......................................... 248/316.4, 346.04
See application file for complete search history.

(56) References Cited

U.S. PATENT DOCUMENTS

| | | | | | |
|---|---|---|---|---|---|
| 5,305,381 | A | * | 4/1994 | Wang ................ | B60R 11/0241 379/426 |
| 5,694,468 | A | * | 12/1997 | Hsu .................. | B60R 11/0241 379/426 |
| 5,903,645 | A | * | 5/1999 | Tsay ................. | B60R 11/0241 248/316.4 |
| 6,085,113 | A | * | 7/2000 | Fan .................. | B60R 11/0241 379/426 |
| 6,229,891 | B1 | * | 5/2001 | Chen ................ | B60R 11/0241 379/446 |
| 6,966,533 | B1 | * | 11/2005 | Kalis ................ | F16M 13/02 248/279.1 |
| 7,418,097 | B2 | * | 8/2008 | Chang .............. | H04M 1/06 379/446 |
| 7,441,981 | B2 | * | 10/2008 | Crain ............... | E06C 7/14 248/124.1 |
| 7,837,166 | B2 | * | 11/2010 | Liao ................. | F16M 11/041 24/523 |

(Continued)

*Primary Examiner* — Bradley Duckworth
(74) *Attorney, Agent, or Firm* — Rabin & Berdo, P.C.

(57) ABSTRACT

A clamper includes a base, a movable element, a sliding element, a connecting bar, a clamping element and a first elastic element. The movable element is movable in a first direction relative to the base. The sliding element is movable in a second direction relative to the base. The connecting bar connects the movable element and the sliding element. The clamping element sets on the sliding element. The first elastic element includes a terminal setting on the sliding element.

20 Claims, 8 Drawing Sheets

(56) References Cited

U.S. PATENT DOCUMENTS

| | | | | |
|---|---|---|---|---|
| 8,136,780 B2* | 3/2012 | Lin | ............... | F16M 11/28 |
| | | | | 248/316.4 |
| 2004/0026590 A1* | 2/2004 | Lin | ............... | A47B 23/002 |
| | | | | 248/346.04 |
| 2010/0155562 A1* | 6/2010 | He | ............... | B60R 11/02 |
| | | | | 248/425 |
| 2011/0266409 A1* | 11/2011 | Warrick | ............... | A61J 1/16 |
| | | | | 248/316.5 |
| 2012/0280101 A1* | 11/2012 | Bouverie | ............... | F16B 2/12 |
| | | | | 248/316.4 |
| 2014/0097306 A1* | 4/2014 | Hale | ............... | F16M 13/022 |
| | | | | 248/122.1 |
| 2015/0049204 A1* | 2/2015 | Okabe | ............... | G03B 17/12 |
| | | | | 348/207.1 |
| 2015/0072555 A1* | 3/2015 | Riddiford | ............... | F16M 11/041 |
| | | | | 439/575 |
| 2015/0129724 A1* | 5/2015 | Kohmoto | ............... | F16B 2/12 |
| | | | | 248/52 |
| 2015/0192155 A1* | 7/2015 | Chen | ............... | H04N 5/2251 |
| | | | | 348/376 |
| 2015/0267863 A1* | 9/2015 | Chang | ............... | A45B 3/00 |
| | | | | 248/333 |
| 2015/0305518 A1* | 10/2015 | Galant | ............... | F16M 11/041 |
| | | | | 248/551 |
| 2015/0336495 A1* | 11/2015 | Maslakow | ............... | B60N 3/00 |
| | | | | 224/401 |
| 2015/0359114 A1* | 12/2015 | Yang | ............... | F16M 11/041 |
| | | | | 248/161 |
| 2016/0108942 A1* | 4/2016 | Yu | ............... | F16M 13/00 |
| | | | | 248/316.4 |
| 2016/0198838 A1* | 7/2016 | Abreu | ............... | A45C 11/00 |
| | | | | 224/183 |

* cited by examiner

CLAMPER AND DEVICE USING THE SAME

This application claims the benefit of Taiwan application Serial No. 103117072, filed May 15, 2014, the subject matter of which is incorporated herein by reference.

BACKGROUND OF THE INVENTION

Field of the Invention

The invention relates in general to a clamper and a device using the same, and more particularly to a clamper for clamping an object and a device using the same.

Description of the Related Art

Along with the popularity of an image device such as a liquid-crystal display (LCD) or a LCD television, user often disposes an image capturing device on the top thereof for capturing an image, wherein the image capturing device is, for example, network camera such as Webcam, etc. Or, a cell phone, tablet or an event data recorder (EDR) disposed within a car is fixed by a clamper. In addition, an application of a digital camera being fixed to the cell phone by a clamper is also getting popular, and the clamper also may be designed in single body for unity of appearance.

However, in conventional method, a clamping head of a conventional clamper is only opened or closed by manual method and can't be opened automatically, and the tightness of the clamping head is adjusted only by manual method. Therefore, it is inconvenient to use the conventional clamper.

SUMMARY OF THE INVENTION

The invention is directed to a clamper and a device using the same. In an embodiment, the clamper may fix two individual devices.

According to an embodiment of the present invention, a clamper is provided. The clamper includes a base, a movable element, a sliding element, a connecting bar, a clamping element and a first elastic element. The movable element is disposed on the base and is movable in a first direction relative to the base. The sliding element is disposed on the base and is movable in a second direction relative to the base. The connecting bar connects the movable element and the sliding element. The clamping element sets on the sliding element. The first elastic element includes a terminal connecting to the sliding element.

According to an embodiment of the present invention, a clamper is provided. The clamper includes a base, a movable element, a sliding element, a connecting bar, a clamping element and a first elastic element. The movable element is movable in a first direction relative to the base. The sliding element is movable in a second direction relative to the base. The connecting bar connects the movable element and the sliding element. The clamping element sets on the sliding element. The first elastic element includes a terminal connecting to the sliding element.

According to an embodiment of the present invention, a clamper is provided. The clamper is for being disposed on a first device and clamping a second device and includes a movable element, a sliding element, a connecting bar, a clamping element and a first elastic element. The movable element moves between a free position and a stop position in a first direction. The sliding element moves between a first position and a second position in a second direction. The connecting bar connects the movable element and the sliding element. The clamping element moves together with the sliding element. The first elastic element includes a terminal connecting to the sliding element.

According to an embodiment of the present invention, a clamper is provided. The clamper includes a base, a movable element, a sliding mechanism, two clamping elements and a first elastic element. The movable element moves in a first direction. The sliding mechanism is disposed on the base and moves in a second direction, wherein the sliding mechanism comprises two sliding elements and two connecting bars, and the connecting bars connect the movable element and the sliding elements respectively. The clamping elements connect with the sliding elements respectively. The first elastic element connects the sliding elements.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
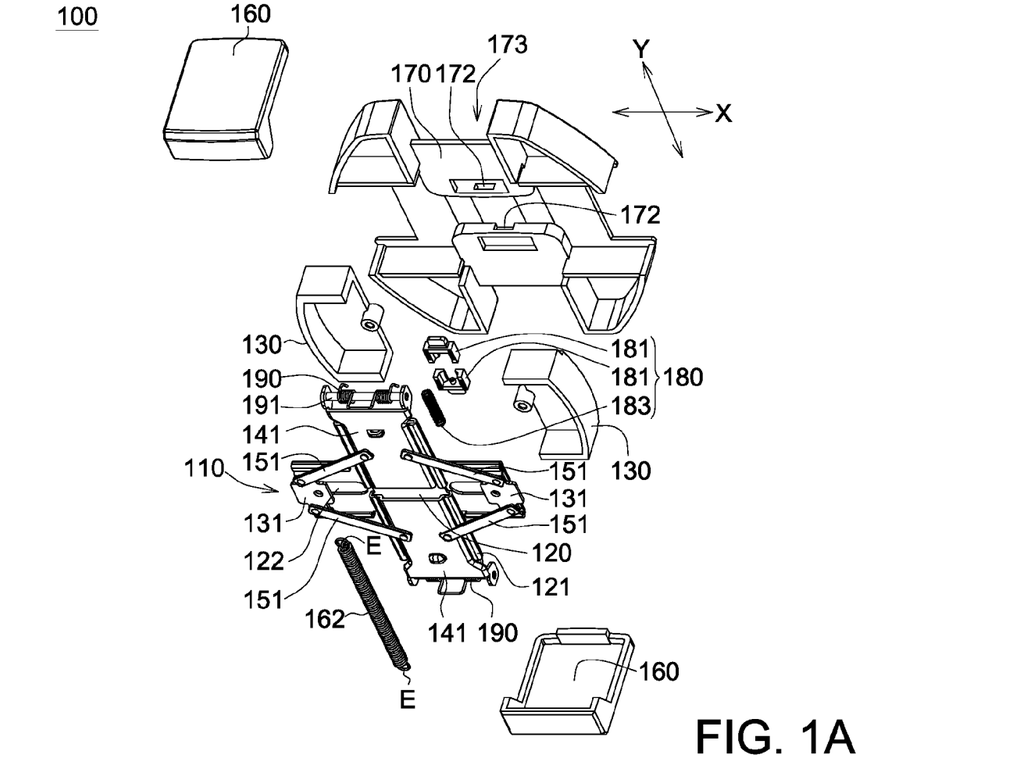
FIG. 1A shows a decomposed diagram of a clamper according to an embodiment of the invention.
Figure 1B:
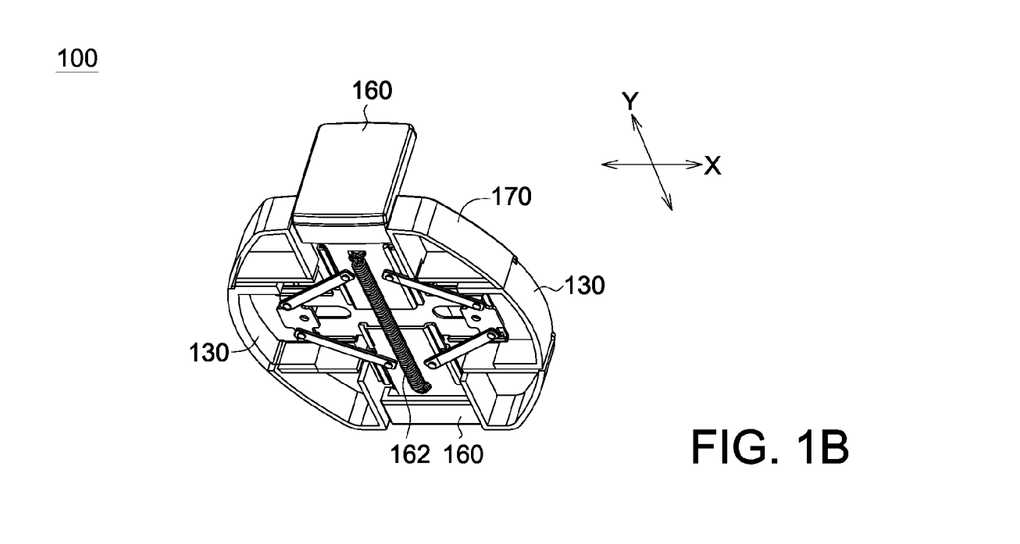
FIG. 1B shows an assembling diagram of the clamper of FIG. 1A.

FIG. 1A shows a decomposed diagram of a clamper 100 according to an embodiment of the invention, and FIG. 1B shows an assembling diagram of the clamper 100 of FIG. 1A.

As shown in FIGS. 1A and 1B, the clamper 100 includes a sliding mechanism 110, a base 120, at least one movable element 130, at least one clamping element 160, a first elastic element 162, a housing 170 and at least one fastener 180.

The housing 170 may accommodate the sliding mechanism 110, the base 120, the first elastic element 162 and the fastener 180, wherein the movable element 130 and the clamping element 160 are mounted on the housing 170. In detail, the sliding mechanism 110 includes at least one sliding block 131, at least one sliding element 141 and at least one connecting bar 151, and a pivot axis 191 and at least one second elastic element 190 are set between the clamping element 160 and the sliding element 141.

As shown in FIG. 1A, in an embodiment, the clamper 100 includes a base 120 and two movable elements 130, wherein two movable elements 130 are disposed on two opposite sides of the base 120, and the movable elements 130 may be movable in a first direction X relative to the base 120.

As shown in FIG. 1A, the clamper 100 may include a sliding mechanism 110, a base 120, two movable elements 130, two clamping elements 160, a first elastic element 162 and a housing 170. The sliding mechanism 110 includes two sliding blocks 131, two sliding elements 141 and four connecting bars 151. The sliding blocks 131 may be movable in the first direction X relative to the base 120. The sliding elements 141 may be movable in the second direction Y relative to the base 120. The first elastic element 162 connects two sliding elements 141. A plurality of terminals (not shown) of the four connecting bars 151 connect the sliding blocks 131 respectively, and other terminals (not shown) of the four connecting bars 151 connect the sliding elements 141 respectively. In addition, two sliding blocks 131 may slide between two movable elements 130. Wherein the first direction X may be perpendicular to the second direction Y.

In addition, two clamping elements 160 may connect two sliding elements 141 respectively in accordance with the pivot axis 191 or other component.

The sliding mechanism 110 having the four connecting bars 151, two sliding elements 141 and two sliding blocks 131 is taken for example and described below; however, such exemplification is not meant to be for limiting.

As shown in FIGS. 1A and 1B, the base 120 has two first guiders 121 and two second guiders 122, wherein the first guider 121 and/or the second guider 122 include grooves. The two sliding elements 141 and the base 120 may relatively move with two first guiders 121 in the second direction Y. In addition, the sliding blocks 131 may be disposed on the base 120, and two sliding blocks 131 may connect or move in accordance with the corresponding two movable elements 130 and be respectively move with the second guider 122 in the first direction X. In an embodiment, two sliding blocks 131 may be screwed to the corresponding movable element 130 in accordance with a screw (not shown).

In the sliding mechanism 110, each connecting bar 151 includes two terminals, wherein one terminal of each connecting bar 151 connects with the movable element 130, and another terminal of each connecting bar 151 connects with the sliding element 141. In other words, each adjacent sliding block 131 and each sliding element 141 may be connected in accordance with one connecting bar 151. Therefore, the movable elements 130 and the base 120 may be relatively movable by pushing the sliding block 131 to drive the sliding elements 141 to move in accordance with the connecting bars 151. In the present embodiment, the movable elements 130 and the sliding mechanism 110 move in a plane defined by the first direction X and the second direction Y.

As shown in FIG. 1A, in an embodiment, two first guiders 121 may be respectively disposed on a moving path of each sliding element 141 for guiding the sliding element 141 and the base to relatively move with the first guider 121 in the second direction Y. The moving directions of the two sliding elements 141 are reverse, that is, two sliding elements 141 may simultaneously approach or simultaneously move away from the base 120 in accordance with two first guiders 121. In addition, two second guiders 122 may be disposed on a moving path of each sliding block 131 for guiding each sliding block 131 and the base 120 to relatively move in the first direction X in accordance with second guider 122, wherein the moving directions of the two sliding blocks 131 are reverse, that is, two sliding blocks 131 may simultaneously approach or simultaneously move away from the base 120 in accordance with two second guiders 122.

As shown in FIGS. 1A and 1B, the first elastic element 162 may connect two sliding elements 141, and is lengthened or shortened along with the each sliding element 141 moving in the second direction Y; meanwhile, the first elastic element 162 also provide two sliding elements 141 with an restoring force. Wherein, an applying direction of the restoring force and the moving direction of two sliding elements 141 are reverse and the first elastic element 162 may be a linear spring or a tension spring.

In another embodiment, the first elastic element 162 may include two springs. In detail, one terminal of each spring may connect two sliding elements 141 respectively, and another terminal of the each spring connects with the base 120 simultaneously. Accordingly, each sliding element 141 may independently move in the second direction Y. The spring may be a linear spring, a tension spring or a combination thereof.

In addition, the clamper 100 further includes at least two second elastic elements 190. Each second elastic element 190 includes two terminals (not shown), wherein each terminal of each second elastic element 190 is respectively set between each sliding element 141 and the corresponding clamping element 160 for providing the clamping element 160 with a rotating force toward a rotating expanded position. The first direction X may be perpendicular to the second direction Y, the clamping element 160 may rotate in a plane parallel to the second direction Y and perpendicular to the first direction X, and the second elastic element 190 may be a torsional spring.

Figure 2A:
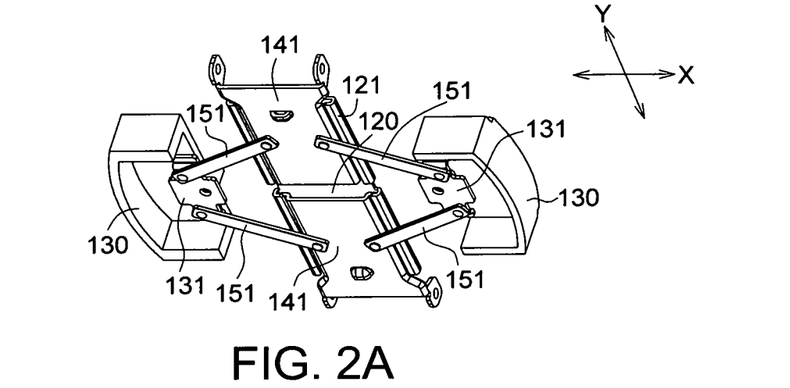
FIG. 2A shows a diagram of the sliding mechanism of the clamper according to another embodiment.
Figure 2B:
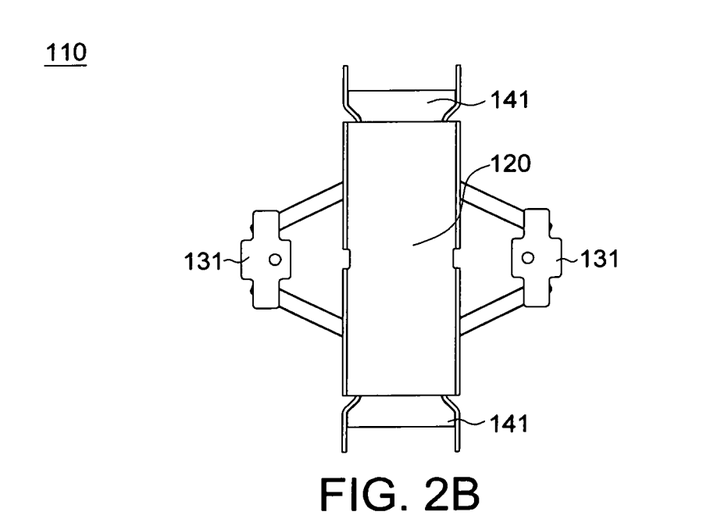
FIG. 2B shows a top view of the sliding mechanism 110 of FIG. 2A.

FIG. 2A shows a diagram of the sliding mechanism 110 of the clamper 100 according to another embodiment, and FIG. 2B shows a top view of the sliding mechanism 110 of FIG. 2A.

As shown in FIGS. 2A and 2B, the base 120 may omit the second guider 122. In the present embodiment, when the first guider 121 guides the sliding element 141 to moves relative to the base 120, the sliding mechanism 110 and two movable elements 130 may be movable in accordance with the four connecting bare 151 and the two sliding blocks 131, and two sliding blocks 131 and two movable elements 130 may be relatively movable in a predetermined path in accordance with the four connecting bars 151.

Figure 3A:
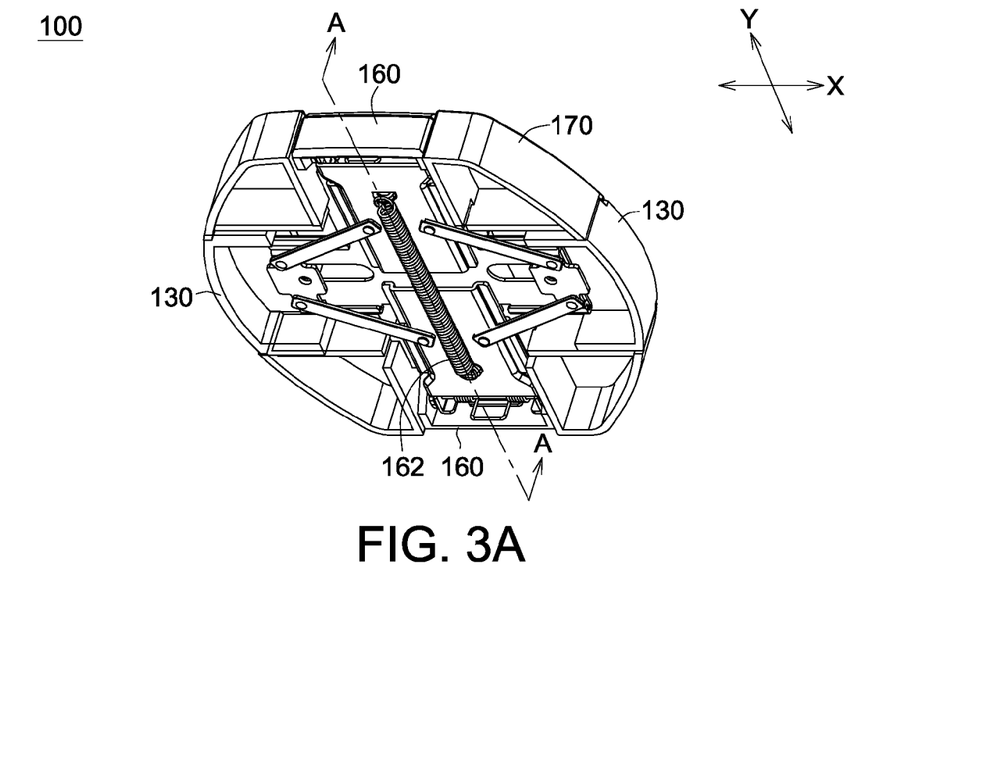
FIG. 3A shows a diagram of the clamper being at an accommodated state.
Figure 3B:
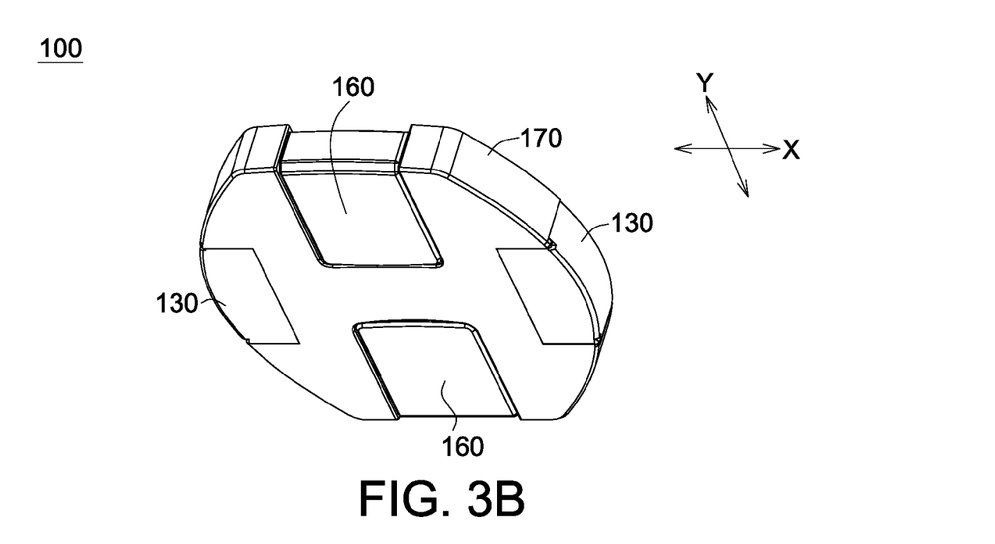
FIG. 3B shows a diagram of the clamper of FIG. 3A rotating by 180 degrees.
Figure 3C:
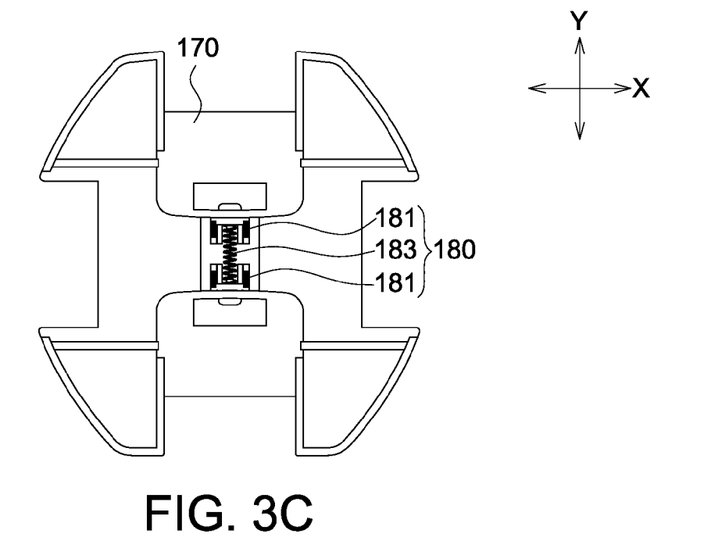
FIG. 3C shows a bottom view of the fastener of FIG. 3A.
Figure 3D:
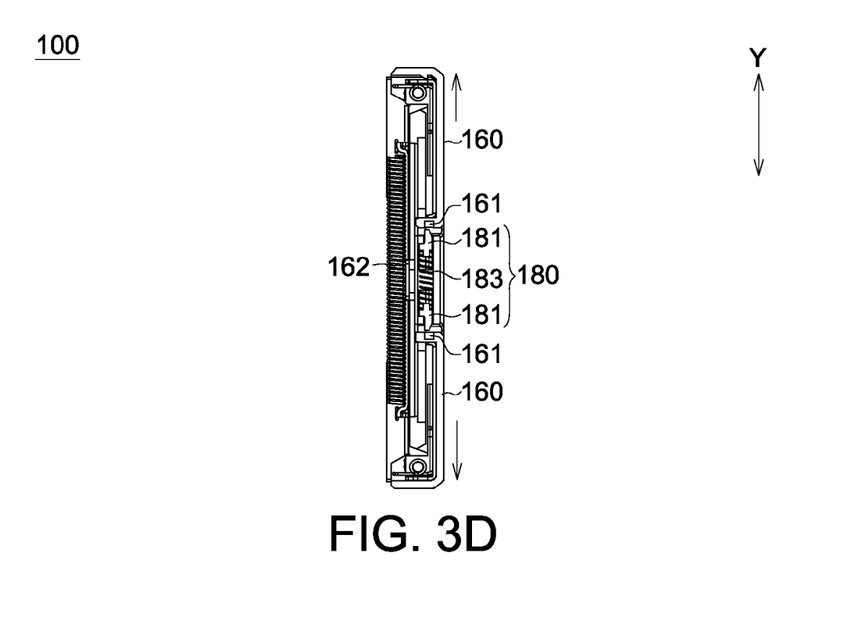
FIG. 3D shows a cross-sectional view of the clamper of FIG. 3A along a direction A-A'.

FIG. 3A shows a diagram of the clamper 100 being at an accommodated state, FIG. 3B shows a diagram of the clamper 100 of FIG. 3A rotating by 180 degrees, FIG. 3C shows a bottom view of the fastener 180 of FIG. 3A, and FIG. 3D shows a cross-sectional view of the clamper 100 of FIG. 3A along a direction A-A'.

As shown in FIGS. 1A and 3A to 3D, the housing 170 may include an accommodation recess 173, the fastener 180 may include two protrusions 181, and each clamping element 160 may include an indentation 161, wherein the protrusions 181 are disposed corresponding to the indentations 161. When the clamper 100 is at the accommodated state, the clamping element 160 may be accommodated in the accommodation recess 173 and the indentation 161 of each clamping element 160 is engaged with the protrusion 181 of the fastener 180 respectively. At this time, the clamping element 160 is at an engaging position.

As shown in FIGS. 3C to 3D, in detail, the fastener 180 may include two protrusions 181 and a third elastic element 183. The third elastic element 183 is disposed between two protrusions 181 and applies a radial pushing force to two protrusions 181, that is, the third elastic element 183 applies the pushing force toward the second direction Y away from the clamper 100. On the other hand, the indentation 161 of each clamping element 160 is engaged with the corresponding protrusion 181, and two protrusions 181 and the indentation 161 are tightly engaged with the pushing force of the third elastic element 183, such that the clamping element 160 is stably held at the engaging position.

In another embodiment, the position of the protrusion 181 and the position of the indentation 161 may exchange. That is, the fastener 180 may have two indentations, and each clamping element 160 may have one indentation and one third elastic element pushing the protrusion 181.

As shown in FIGS. 1A and 3D, in detail, the third elastic element 183 may be a linear spring or a compression spring, wherein the third elastic element 183 may make each protrusion 181 passing through two openings 172 of the housing 170 be held at the engaging position. However, in another embodiment, the third elastic element 183 is not limited to be disposed between two protrusions 181, and each protrusion 181 also may be assembled to the housing 170 independently or be integrated with the housing 170 into single piece.

Figure 4A:
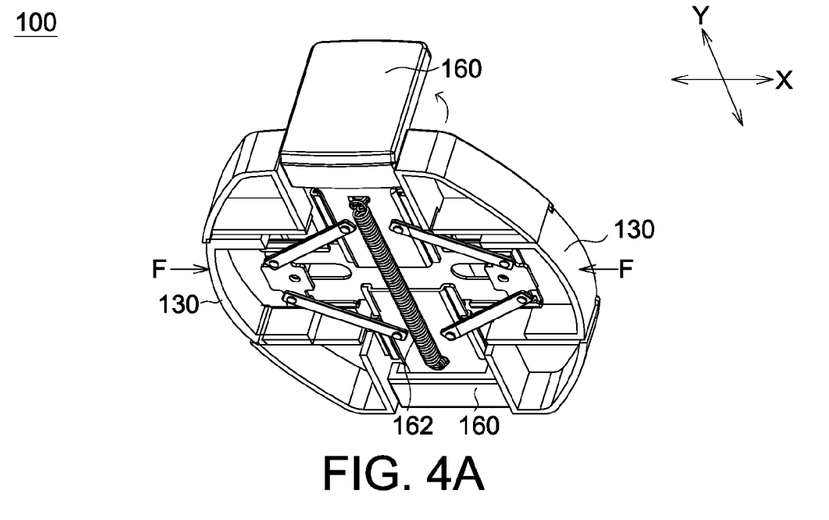
FIG. 4A shows a diagram of the movable element of the clamper being at a temporary position.
Figure 4B:
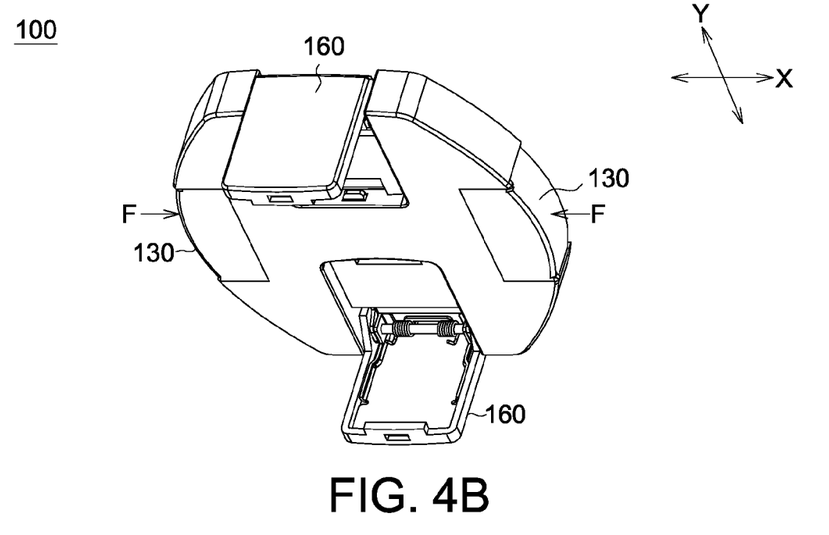
FIG. 4B shows a diagram of the clamper of FIG. 4A rotating by 180 degrees.
Figure 5A:
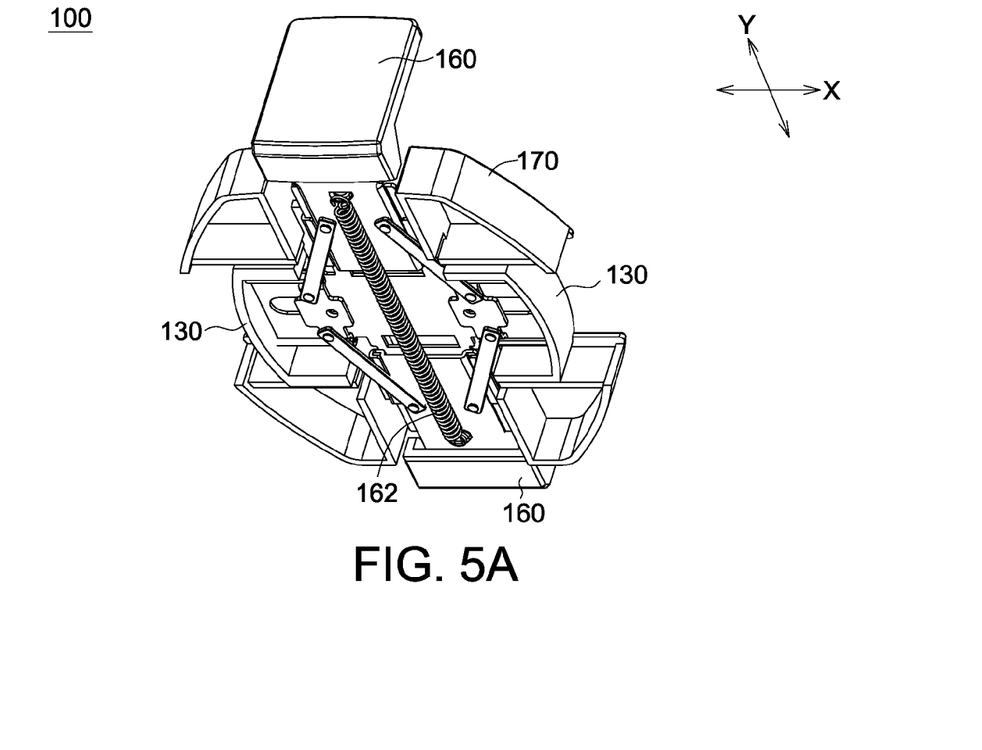
FIG. 5A shows a diagram of the movable element of the clamper being at a stop position.
Figure 5B:
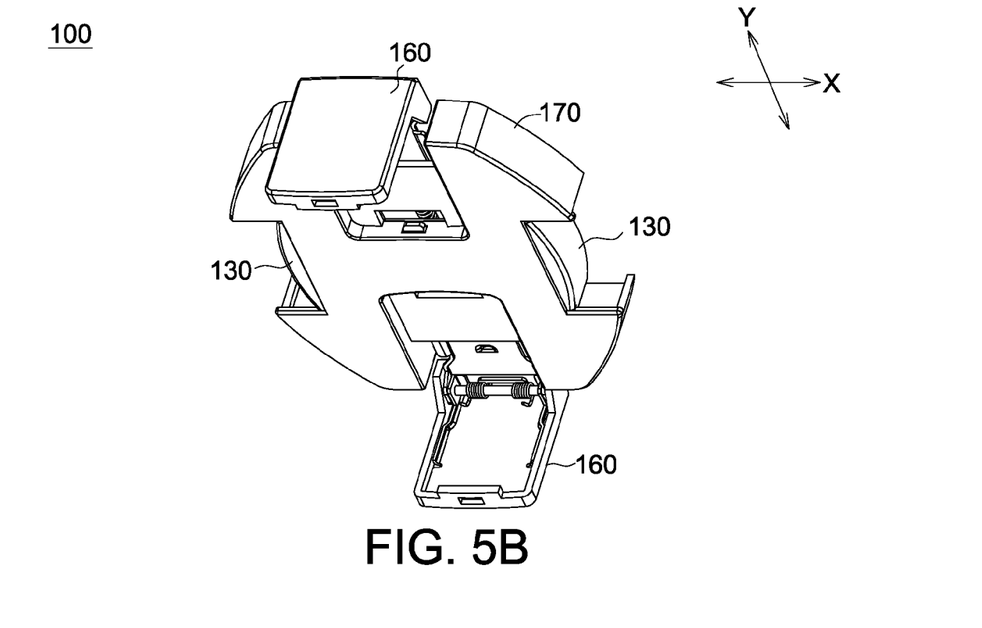
FIG. 5B shows a diagram of the clamper of FIG. 5A rotating by 180 degrees.
Figure 6A:
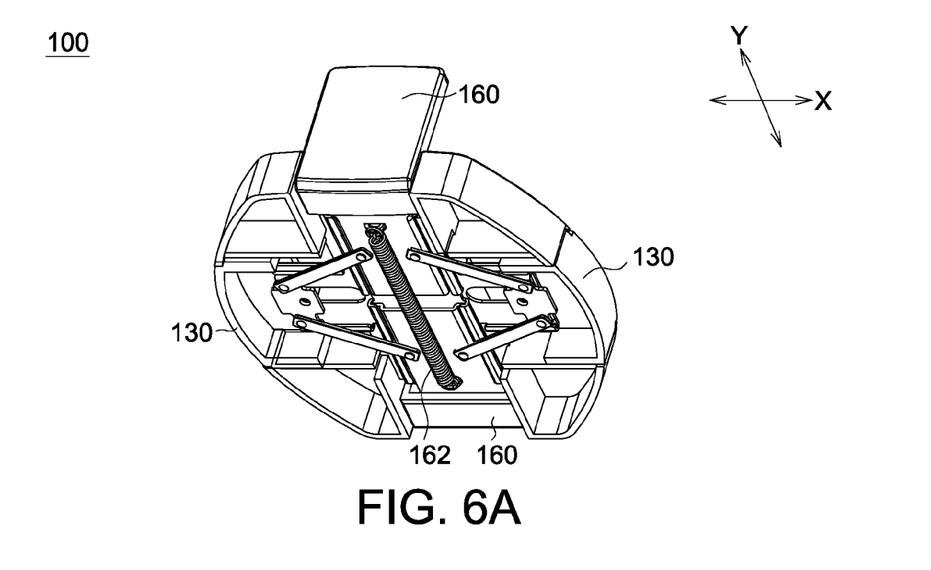
FIG. 6A shows a diagram of the movable element of the clamper returning back a free position.
Figure 6B:
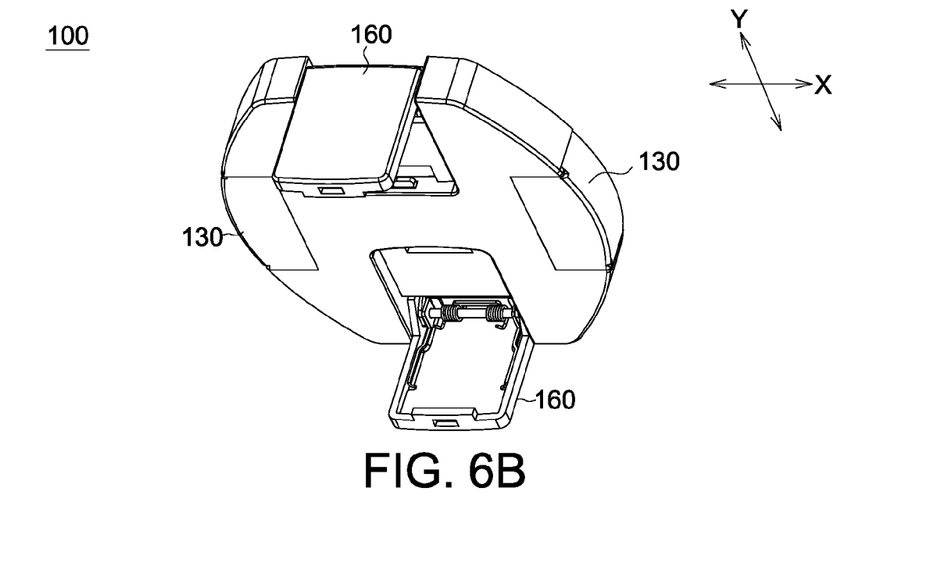
FIG. 6B shows a diagram of the clamper of FIG. 6A rotating by 180 degrees.
Figure 7A:
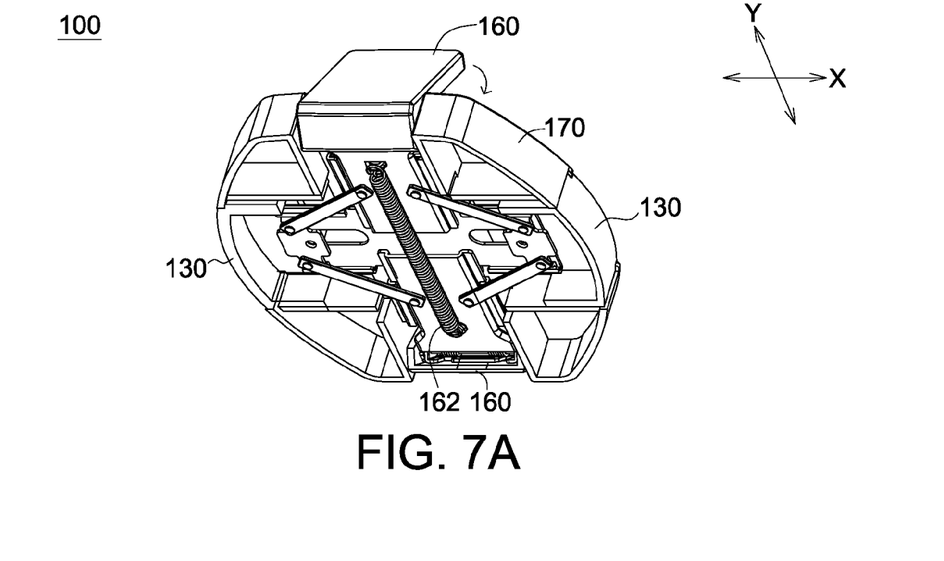
FIG. 7A shows a diagram of the clamping element of the clamper rotating to the engaging position.
Figure 7B:
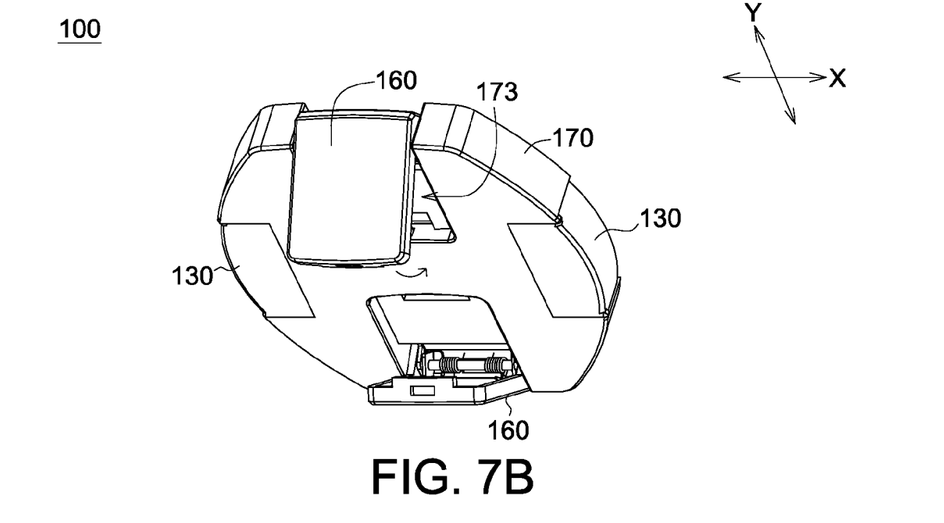
FIG. 7B shows a diagram of the clamper of FIG. 7A rotating by 180 degrees.

FIG. 4A shows a diagram of the movable element 130 of the clamper 100 being at a temporary position, FIG. 4B shows a diagram of the clamper 100 of FIG. 4A rotating by 180 degrees, FIG. 5A shows a diagram of the movable element 130 of the clamper 100 being at a stop position, FIG. 5B shows a diagram of the clamper 100 of FIG. 5A rotating by 180 degrees, FIG. 6A shows a diagram of the movable element 130 of the clamper 100 returning back a free position, FIG. 6B shows a diagram of the clamper 100 of FIG. 6A rotating by 180 degrees, FIG. 7A shows a diagram of the clamping element 160 of the clamper 100 rotating to the engaging position, and FIG. 7B shows a diagram of the clamper 100 of FIG. 7A rotating by 180 degrees.

FIGS. 3A, 3B, and 4A to 7B show diagrams of the clamper 100 starting from the accommodated state, through the clamping element 160 being rotating to expand, stretch, to move to a maximum clamping position, and then returning back the accommodation state of the clamper 100.

As shown in FIGS. 3A and 3B, the movable element 130 is at a free position of the accommodated state. At this time, the sliding element 141 of the sliding mechanism 110 is at a first position, and the clamping element 160 is at an engaging position. As shown in FIGS. 4A and 4B, the movable element 130 is at a temporary position. At this time, the sliding element 141 is at a third position, and the clamping element 160 moves in the second direction Y from the engaging position and rotates to an expanded position. As shown in FIGS. 5A and 5B, the movable element 130 is at a stop position. At this time, the sliding element 141 is at a second position, and the clamping element 160 is at the maximum clamping position. As shown in FIGS. 6A to 7B, the movable element 130 is returned back the free position. At this time, the sliding element 141 is returned back the first position, and the clamping element 160 is returned back the engaging position from the expanded position.

As shown in FIGS. 3A, 3B and 5A, when an effective exterior force F in the first direction X is applied toward the base 120 to push the movable element 130, the movable element 130 may move to the stop position from the free position. At this time, the movable element 130 may push the connecting bar 151, and the sliding element 141 moves away from the base 120 in the second direction Y in accordance with the pushing of the connecting bar 151. That is, the sliding element 141 may move to the second position from the first position, and the first elastic element 162 may apply a restoring force to the sliding element 141 due to a displacement of the sliding element 141. The applying direction of the restoring force and the moving direction of the sliding element 141 are reverse.

On the other hand, as shown in FIGS. 5A to 6B, once the exterior force F is removed, the sliding element 141 may be returned back the first position from the second position in accordance with the restoring force of the first elastic element 162, such that the sliding element 141 pushes the connecting bar 151, and the movable element 130 may be returned back the free position from the stop position in accordance with the pushing of the sliding element 141 and the connecting bar 151.

As shown in FIGS. 3A to 5B, in detail, when the movable element 130 moves a predetermined distance toward the base 120 to the temporary position, the connecting bar 151 also pushes the sliding element 141 to move to the third position. Since the clamping element 160 moves together with the sliding element 141 in the second direction Y by a displacement away from the base 120, such that the protrusion 181 of the fastener 180 and the indentation 161 of the clamping element 160 are detached from each other. Then, in accordance with the torque of the second elastic element 190, the clamping element 160 rotates to the expanded position from the engaging position. Then, when the movable element 130 continuous to move to the stop position from the temporary position, the connecting bar 151 may further push the sliding element 141 to move to the second position from the third position. At this time, the clamping element 160 may straight move in the second direction Y for being away from the base 120 and moving to the maximum clamping position. The predetermined distance of the movable element 130 that is the distance from the free position to the temporary position may be 5 mm to 15 mm; however, such exemplification is not meant to be for limiting.

In detail, as shown in FIGS. 3D to 4B, when the movable element 130 moves to the temporary position toward the base 120 and makes the clamping element 160 move outward the predetermined distance in accordance with the sliding mechanism 110, the indentation 161 of the clamping element 160 is detached from the corresponding protrusion 181. At this time, clamping element 160 may rotate to the expanded position in accordance with the second elastic element 190.

In another embodiment, the fastener 180 includes a indentation, and the clamping element 160 includes a protrusion. In other embodiment, one of two fasteners 180 includes a indentation, another of the two fasteners includes a protrusion, one of two clamping elements 160 includes a protrusion, and another of two clamping elements 160 includes a indentation, wherein the action and/or configuration of the fasteners 180, the clamping elements 160, the indentations and protrusions are similar to that of the fasteners 180, the clamping elements 160, the indentations and protrusions as mentioned above, and the similarities are not repeated here.

In addition, as shown in FIGS. 5A to 6B, once the external force applied to the movable element 130 is removed, in accordance with the pulling of the restoring force of the first elastic element 162, the sliding element 141 may move toward the base 120 in the second direction Y, and the connecting bar 151 moves along with the sliding element 141 and pushes the movable element 130 to move away from the base 120 in the first direction X. On the other hand, if, before the external force F is removed, an object (not shown) is disposed between two clamping elements 160, the clamper 100 may firm clamps the object in accordance with the clamping element 160 after the external force F is removes.

In addition, as shown in FIGS. 5A to 7B, if the object and the clamper 100 are intended to be disconnected and then the clamper 100 is accommodated, the external force F may be applied to the movable element 130, such that the clamping element 160 straight moves again in the second direction Y to make the clamper 100 loosen the object. At this time, after the object is taken out, the external force F applied to the movable element 130 may be removed to make the clamping element 160 return back the expanded position in accordance with the first elastic element 162, the sliding element 141, the connecting bar 151 and the sliding block 131 which move in accordance with each other. Then, the clamping element 160 may further rotate toward the base 120 to return back the engaging position and makes the clamper 100 is return back the accommodated state. During the clamping element 160 returning back engaging position from the expanded position, the clamping element 160 may rotate in a plane perpendicular first direction X and parallel to the second direction Y.

However, such exemplification is not meant to be for limiting.

In another embodiment, the clamper 100 may further include a sliding mechanism 110, a base 120, a movable element 130, two clamping elements 160, a first elastic element 162 and a housing 170. The sliding mechanism 110 includes a sliding block 131, two sliding elements 141 and two connecting bars 151. Wherein, the sliding block 131 moves relative to the base 120 in the first direction X. The sliding element 141 moves relative to the base 120 in the second direction Y. The first elastic element 162 connects two sliding elements 141. Terminals of two connecting bars 151 connect with the sliding block 131, and other terminals of two connecting bars 151 connect with two sliding elements 141 respectively. Accordingly, the movable element 130 may make two clamping elements 160 rotate to stretch and move away from the base 120 in the second direction Y in accordance with the sliding mechanism 110. Meanwhile, the first elastic element 162 also provides two sliding elements 141 with a pullback restoring force.

Further, the sliding mechanism 110 also includes four connecting bars 151. One terminal of each connecting bar 151 averagely connects with two sliding blocks 131, wherein other terminals of two connecting bars 151 connect with two sliding elements 141 respectively, and other terminals of another two connecting bars 151 connect with the base 120 or the housing 170.

In another embodiment, the clamper 100 may further include a sliding mechanism 110, a base 120, two movable elements 130, two clamping elements 160, a first elastic element 162 and a housing 170. The sliding mechanism 110 includes two sliding blocks 131, a sliding element 141 and two connecting bars 151. The sliding block 131 moves relative to the base 120 in the first direction X. The sliding element 141 moves relative to the base 120 in the second direction Y. The first elastic element 162 connects the sliding element 141 and the base 120, or the first elastic element 162 connects the sliding element 141 and the housing 170. Terminals of two connecting bars 151 connect with the sliding block 131, and other terminals of the two connecting bars 151 connect two sliding elements 141 respectively. Accordingly, the movable element 130 may make one clamping element 160 rotate to stretch and move away from the base 120 in the second direction Y in accordance with the sliding mechanism 110. Meanwhile, the first elastic element 162 also provides the sliding element 141 with a restoring force. In detail, another clamping element 160 may be fixedly disposed on the housing 170.

Further, the sliding mechanism 110 may further include four connecting bars 151. One terminal of each connecting bar 151 averagely connects with two sliding blocks 131, other terminals of two connecting bars 151 connect with two sliding elements 141, and other terminals of another two connecting bars 151 connect with the base 120 or the housing 170.

In another embodiment, the clamper 100 may include a sliding mechanism 110, a base 120, a movable element 130, two clamping elements 160, a first elastic element 162 and a housing 170. The sliding mechanism 110 includes a sliding block 131, a sliding element 141 and a connecting bar 151. Wherein, the sliding block 131 moves relative to the base 120 in the first direction X. The sliding element 141 moves relative to the base 120 in the second direction Y. The first elastic element 162 connects the sliding element 141 and the housing 170. One terminal of the connecting bar 151 connects with the sliding block 131, and another terminal of the connecting bar 151 connects the sliding element 141. Accordingly, the movable element 130 may make one of clamping elements 160 rotate to stretch and move away from the base 120 in the second direction Y in accordance with the sliding mechanism 110. Meanwhile, the first elastic element 162 also provides the sliding element 141 with a restoring force.

Further, the sliding mechanism 110 further includes two connecting bars 151. Terminals of two connecting bars 151 connect with the sliding block 131, and other terminals of two connecting bars 151 respectively connect with the sliding element 141 and the base 120 or the housing 170.

In addition, in one embodiment, the above-mentioned clamper 100 may be disposed on a first device (not shown) and clamps an object. Wherein, the first device includes, but not limited thereto, a lens, a storing device, etc. The object is a second device, and the second device includes, but not limited thereto, a portable electronic device, such as a digital camera, a cell phone, a video camera, etc.

In another embodiment, the clamper 100 is further disposed on the first device, such that the first device and the second device may be fixedly clamped each other with the clamper 100. In detail, the housing 170 may further include a magnetic element (not shown) capable of being fixed to the first device, a locking element (not shown) and/or a fastener (not shown), etc. Wherein, the magnetic element may be fixedly disposed on the first device in accordance with the ferromagnetism. The locking element may be fixedly disposed on the first device in accordance with a screw, a nut and/or a thread. The fastener may be fixedly disposed on the first device in accordance with a clamping ring, a fastener and/or an engaging recess; however, such exemplification is not meant to be for limiting.

In another embodiment, the first device having the above-mentioned clamper 100 may has a light source module having an independent power source, a light-sensitive module having an independent lens or a storing module having function of wireless access, etc. In addition, the first device and the second device may communicate by wire way or wireless way.

As described above, the clamper 100 of the above-mentioned embodiment of this invention makes the clamping element 160 stretch outward by sliding way, such that the clamping element 160 is detached from the fastener 180 and rotate to expand to the clamping position. In addition, after user releases the movable element 130, the clamping element 160 may clamp the first device or the object in accordance with the restoring force of the first elastic element 162. In addition, when the clamping element 160 does not be used, the clamping element 160 may be accommodated within the accommodation recess 173 of the housing 170.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A clamper, comprising:
a base;
a housing accommodating the base;
a first elastic element having a terminal;
a movable element mounted on the housing and movable relative to the base in a first direction;
a sliding element connected to the terminal and movable relative to the base in a second direction;
a clamping element set on the sliding element and accommodatable within the housing; and
a connecting bar connected to the sliding element and movable with the movable element.

2. The clamper according to claim 1, wherein the base comprises a first guider, and the sliding element and the base are moved relative to each other by the first guider.

3. The clamper according to claim 1, wherein the base comprises a second guider, and the movable element and the base are moved relative to each other by the second guider.

4. The clamper according to claim 3, further comprising a sliding block, wherein two terminals of the connecting bar connect the sliding block and the sliding element respectively, and the sliding block is moved via the second guider with the movable element.

5. The clamper according to claim 1, further comprising a fastener, wherein the housing and the clamping element are engaged with the fastener.

6. The clamper according to claim 5, wherein the housing comprises an accommodation recess, and the clamping element is accommodated in the accommodation recess and engages the housing.

7. The clamper according to claim 1, further comprising at least one second elastic element, wherein the second elastic element is set between the sliding element and the clamping element.

8. The clamper according to claim 1, wherein the first direction and the second direction are substantially perpendicular.

9. A clamper, comprising:
a housing;
a first elastic element comprising a terminal;
a movable element mounted on the housing and movable in a first direction between a free position and a stop position;
a sliding element connected to the terminal and movable in a second direction between a first position and a second position;
a clamping element movable by the sliding element and accommodatable within the housing; and
a connecting bar connected to the sliding element and movable with the movable element.

10. The clamper according to claim 9, further comprising a second elastic element, wherein the second elastic element is set between the sliding element and the clamping element.

11. The clamper according to claim 10, wherein when the movable element moves from the free position toward the stop position, the connecting bar pushes the sliding element to move from the first position toward the second position, and the clamping elements is rotated by the second elastic element.

12. The clamper according to claim 9, wherein the housing comprises an accommodation recess, and while the clamping element is accommodated in the accommodation recess, the clamping element and the housing are engaged.

13. The clamper according to claim 9, further comprising a fastener, wherein the clamping element is disengageably engaged with the housing by the fastener.

14. The clamper according to claim 13, wherein while the movable element moves from the free position towards the stop position, the clamping element moves along the second direction after detaching from the fastener.

15. The clamper according to claim 13, further comprising a second elastic element, wherein the second elastic element is set between the sliding element and the clamping element, and the clamping element is rotated by the second elastic element after detaching from the fastener.

16. A clamper, comprising:
a housing;
a movable element mounted on the housing and movable in a first direction;
a sliding mechanism comprising two sliding elements and at least two connecting bars, the connecting bars being connected to the sliding elements respectively and being movable with the movable element;
two clamping elements connected to the two sliding elements respectively and accommodatable within the housing; and
a first elastic element between the sliding elements.

17. The clamper according to claim 16, further comprising two second elastic elements, each of the second elastic elements being set between one of the two sliding elements and the connected clamping element.

18. The clamper according to claim 16, wherein the sliding elements are movable in a second direction substantially perpendicular to the first direction.

19. An electronic device, comprising a clamper according to claim 16.

20. The clamper according to claim 16, further comprising two fasteners, wherein the two fasteners each have a protrusion and the two clamping elements each have an indentation, and the indentations are engaged with different corresponding ones of the protrusions.

* * * * *